(12) United States Patent
Entin

(10) Patent No.: US 12,417,435 B2
(45) Date of Patent: Sep. 16, 2025

(54) ENGINEERING A PHYSICAL SYSTEM METHOD AND SYSTEM

(71) Applicant: Nikolay Entin, Stuttgart (DE)

(72) Inventor: Nikolay Entin, Stuttgart (DE)

(73) Assignee: SIEMENS INDUSTRY SOFTWARE GMBH, Zurich (CH)

( * ) Notice: Subject to any disclaimer, the term of this patent is extended or adjusted under 35 U.S.C. 154(b) by 244 days.

(21) Appl. No.: 18/077,654

(22) Filed: Dec. 8, 2022

(65) Prior Publication Data
US 2023/0186242 A1   Jun. 15, 2023

Related U.S. Application Data

(63) Continuation of application No. PCT/EP2021/085151, filed on Dec. 10, 2021.

(51) Int. Cl.
*G06Q 10/101* (2023.01)
*G06Q 10/06* (2023.01)
(Continued)

(52) U.S. Cl.
CPC .................. *G06Q 10/101* (2013.01)

(58) Field of Classification Search
CPC .... G06Q 10/101; G06F 2111/02; G06F 30/00
(Continued)

(56) References Cited

U.S. PATENT DOCUMENTS 5,822,206 A * 10/1998 Sebastian ........... G05B 19/4097
                                                                700/182
6,961,687 B1 * 11/2005 Myers, Jr. ............. G06Q 10/06
                                                                715/744
(Continued)

FOREIGN PATENT DOCUMENTS

| EP | 2581865 A2 * | 4/2013 | ....... G06F 17/30578 |
| WO | WO-2018160162 A1 * | 9/2018 | ............. G06F 17/50 |

OTHER PUBLICATIONS

Gecevska, V., Stojanova, T., & Jovanovski, B. (2013). Product Lifecycle Management Tools. Annals of the Faculty of Engineering Hunedoara, 11(1), 219-222. (Year: 2013).*

(Continued)

*Primary Examiner* — Jonathan P Ouellette
(74) *Attorney, Agent, or Firm* — Lempia Summerfield Katz LLC

(57) ABSTRACT

Systems and methods for an improved engineering of a physical system with the aid of corresponding lifecycle information. A computer-implemented method includes: providing engineering information related to the physical system in an engineering database; providing lifecycle information related to the physical system in a lifecycle database; displaying, by a display device, some of the engineering information and some of the lifecycle information of the physical system, respectively, in an engineering user interface (UI); capturing a user's input relating to an import of selected lifecycle information from the lifecycle database to the engineering database in response to user interactions with the engineering UI; generating a connector for importing the selected lifecycle information from the lifecycle database to the engineering database; importing the selected lifecycle information from the lifecycle database to the engineering database using the generated connector; and determining further engineering information of the physical system using the lifecycle information selected by the user and imported from the lifecycle database to the engineering database.

15 Claims, 4 Drawing Sheets

(51) Int. Cl.
 *G06Q 10/10* (2023.01)
 *G06Q 30/02* (2023.01)
 *G06Q 30/04* (2012.01)
 *G06Q 30/06* (2023.01)

(58) Field of Classification Search
 USPC .................................................. 705/1.1, 300
 See application file for complete search history.

(56) References Cited

U.S. PATENT DOCUMENTS

| | | | |
|---|---|---|---|
| 9,135,372 B2 * | 9/2015 | Delarue | G06F 3/0482 |
| 9,424,528 B2 * | 8/2016 | Kaushal | G05B 13/0265 |
| 9,633,323 B2 * | 4/2017 | Fairbrother | G06Q 10/06313 |
| 9,799,002 B2 * | 10/2017 | Lohmueller | G06F 16/60 |
| 11,328,101 B2 * | 5/2022 | Wang | G06F 30/10 |
| 2002/0178170 A1 | 11/2002 | Britton et al. | |
| 2005/0080502 A1 * | 4/2005 | Chernyak | G06F 30/00 716/112 |
| 2006/0174190 A1 * | 8/2006 | Gomes | G06F 40/166 715/255 |
| 2006/0224618 A1 | 10/2006 | Garden et al. | |
| 2008/0077902 A1 * | 3/2008 | Harashima | G06F 30/00 716/119 |
| 2016/0188675 A1 * | 6/2016 | Vossler | H04L 67/12 707/776 |
| 2016/0247129 A1 * | 8/2016 | Song | G06Q 10/20 |
| 2017/0132556 A1 * | 5/2017 | Dobinson | G06Q 10/063114 |
| 2018/0137219 A1 * | 5/2018 | Goldfarb | G06N 3/126 |
| 2018/0293597 A1 * | 10/2018 | Koese | G06Q 10/20 |
| 2019/0073436 A1 * | 3/2019 | Uppunda | G06F 30/00 |
| 2023/0004149 A1 * | 1/2023 | Dehghanimohammadabadi | G05B 19/4188 |

OTHER PUBLICATIONS

Nemceková, M. (2011). Product Modeling With Knowledge Storage. Annals of the Faculty of Engineering Hunedoara, 9(3), 235-237. (Year: 2011).*

* cited by examiner

ENGINEERING A PHYSICAL SYSTEM METHOD AND SYSTEM

CROSS REFERENCE TO RELATED APPLICATIONS

This application is a continuation under 37 C.F.R. § 1.53(b) of PCT PCT/EP2021/085151 filed on Dec. 10, 2021, which is hereby incorporated in its entirety by reference.

FIELD

The present disclosure is directed, in general, to engineering systems, engineering management systems, systems engineering systems, and similar systems, such as computer-aided design (CAD), computer-aided manufacturing (CAM), computer-aided engineering (CAE), and electronic design automation (EDA), that are used to design, integrate, and manage physical systems, such as machines, structures, and other items, including bridges, tunnels, roads, vehicles, and buildings. The present disclosure is further directed, in general, to product lifecycle management (PLM) systems, application lifecycle management (ALM) systems, for example for software, artifact information systems, and similar systems, that are used to create, use, and manage data for products including software and artifacts and other items. The mentioned systems are collectively referred to herein as product systems. Further, the present disclosure is directed, in general, to the interplay of the mentioned engineering systems and the PLM or ALM systems.

BACKGROUND

Product systems may include stored content associated with physical systems and product lifecycle information of physical systems. Such content may include engineering information and lifecycle information of the physical system to be engineered.

Currently, there exist product systems and solutions which support engineering a physical system. Such product systems may benefit from improvements.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Variously disclosed embodiments include data processing systems and methods that may be used to facilitate engineering a physical system, especially engineering a physical system with the aid of corresponding lifecycle information.

In an embodiment, a computer-implemented method of engineering a physical system may include: providing engineering information in an engineering database, the engineering information being related to physical, mechanical, electrical, electronic, hydraulic, thermal, control, electric power and/or process-oriented information of the physical system, providing lifecycle information in a lifecycle database, the lifecycle information being related to the conception, requirements, uses cases, issues, design, realization and/or service information of the physical system; displaying, by a displaying device, a portion of the engineering information and a portion of the lifecycle information of the physical system, respectively, in an engineering user interface (UI); capturing a user's input relating to an import of selected lifecycle information from the lifecycle database to the engineering database in response to user interactions with the engineering UI; generating a connector for importing the selected lifecycle information from the lifecycle database to the engineering database; importing the selected lifecycle information from the lifecycle database to the engineering database using the generated connector; and determining further engineering information of the physical system using the lifecycle information selected by the user and imported from the lifecycle database to the engineering database.

According to an embodiment, a computer system may be arranged and configured to execute the steps of this computer-implemented method of engineering a physical system. For example, the described computer system may be arranged and configured to execute the following steps: providing engineering information in an engineering database, the engineering information being related to physical, mechanical, electrical, electronic, hydraulic, thermal, control, electric power and/or process-oriented information of the physical system, providing lifecycle information in a lifecycle database, the lifecycle information being related to the conception, requirements, uses cases, issues, design, realization and/or service information of the physical system; displaying, by a displaying device, some of the engineering information and some of the lifecycle information of the physical system, respectively, in an engineering user interface (UI); capturing a user's input relating to an import of selected lifecycle information from the lifecycle database to the engineering database in response to user interactions with the engineering UI; generating a connector for importing the selected lifecycle information from the lifecycle database to the engineering database; importing the selected lifecycle information from the lifecycle database to the engineering database using the generated connector; and determining further engineering information of the physical system using the lifecycle information selected by the user and imported from the lifecycle database to the engineering database.

According to an embodiment, a computer program product may include computer program code which, when executed by a computer system, cause the computer system to carry out this computer-implemented method of engineering a physical system.

According to an embodiment, a computer-readable medium may include computer program code which, when executed by a computer system, cause the computer system to carry out this computer-implemented method of engineering a physical system. By way of example, the described computer-readable medium may be non-transitory and may further be a software component on a storage device.

The foregoing has outlined rather broadly the technical features of the present disclosure so that those skilled in the art may better understand the detailed description that follows. Additional features and advantages of the disclosure will be described hereinafter. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
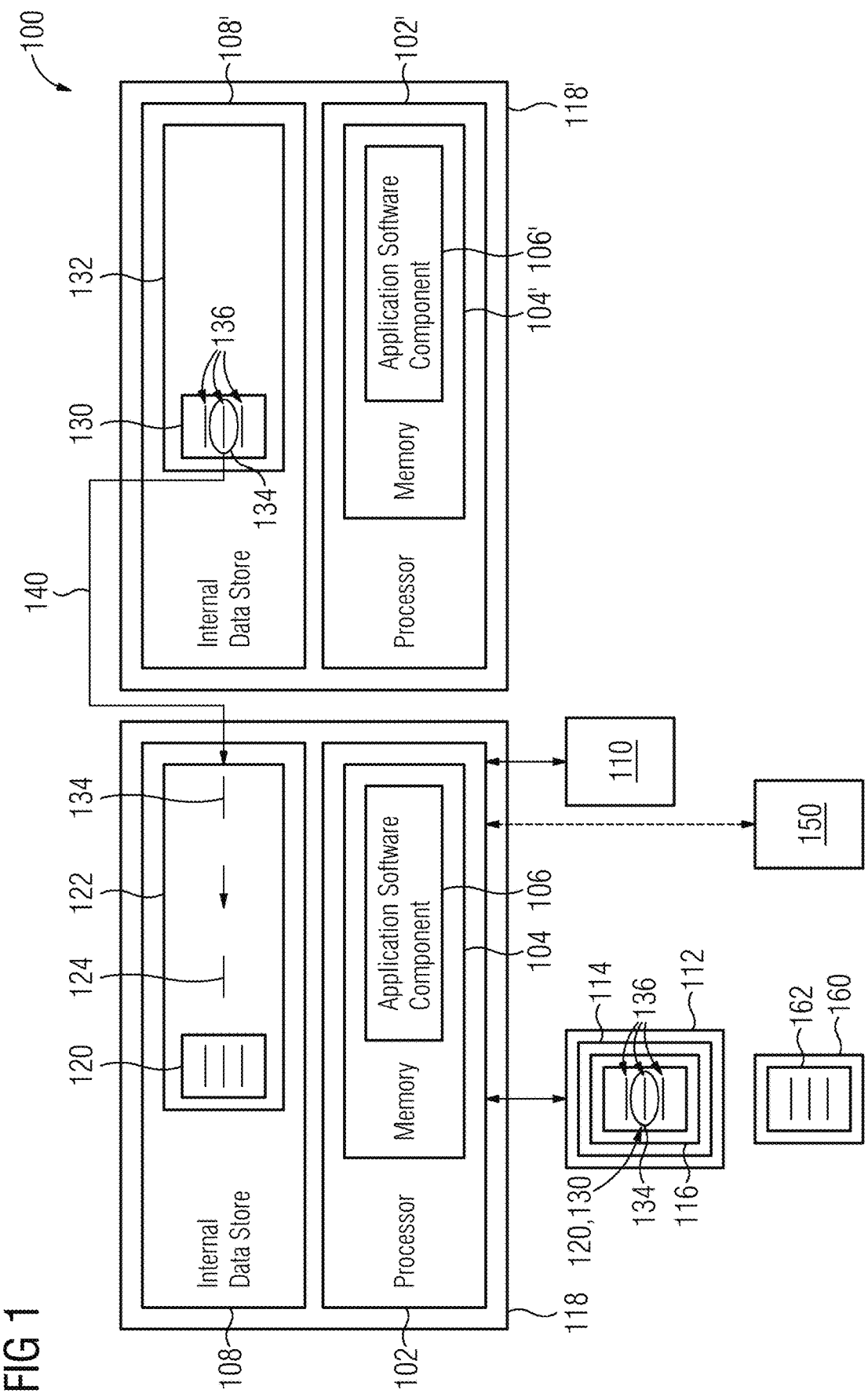
FIG. 1 depicts a functional block diagram of an example system that facilitates engineering a physical system, for example engineering a physical system with the aid of corresponding lifecycle information, in a product system according to an embodiment.

Various technologies that pertain to systems and methods for engineering a physical system, for example engineering a physical system with the aid of corresponding lifecycle information, in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present patent document will be described with reference to non-limiting embodiments.

With reference to FIG. 1, a functional block diagram of an example data processing system 100 is depicted that facilitates engineering a physical system 150. The data processing system 100 may, in some examples, include an engineering system 118 and a product lifecycle management system 118'. The engineering system 118 and the product lifecycle management system 118' may, by way of example, each include at least one processor 102, 102' that is configured to execute at least one respective application software component 106, 106' from a respective memory 104, 104' accessed by the respective processor 102, 102'. The respective application software component 106, 106' may be configured (i.e., programmed) to cause the respective processor 102, 102' to carry out various acts and functions described herein. For example, the described application software component 106, 106' may include and/or correspond to one or more components of an engineering software application or to a PLM or ALM software application that is configured to generate and store product data in a data store 108, 108' such as a database, respectively.

In some examples, the engineering system 118 may allow for the engineering a physical system 150 by providing corresponding functionalities to a user and by creating, amending, or managing corresponding engineering information 120 relating to the physical system 150. The product lifecycle management system 118' may, e.g., allow for the management of lifecycle information 130 by providing corresponding functionalities to a user and by creating, amending, or managing corresponding lifecycle information 130 relating to the physical system 150. By way of example, the engineering information 120 may relate to physical, mechanical, electrical, electronic, hydraulic, thermal, control, electric power and/or process-oriented information of the physical system. Further, the lifecycle information 130 may, e.g., relate or include to the conception, requirements, uses cases, issues, design, realization and/or service information of the physical system 150. In further examples, the lifecycle information 130 may, e.g., include data records representing/storing data corresponding to parts, tools, documents, process descriptions, templates, materials, requirements specifications, software products, or software applications relating to the physical system 150, respectively. In further embodiments, the lifecycle information 130 may include test information, test cases or test management information with respect to the physical system 150, whereby the test information, test cases or test management information may be used to qualify the physical system 150 as compliant with certain requirements or specifications or to find issues of the physical system 150. Such test information, test cases or test management information may further be available for different variants of the physical system 150, e.g., standard, premium, luxury variants of a car, low-, middle, high-power output machines, etc., wherein an issue identified for at least one variant of the physical system 150 using the test information, test cases or test management information may equally apply to the other variants of the physical system 150. Hence, an issue identified for at least one variant of the physical system 150 may easily be checked or verified for the other variants of the physical system 150.

In some examples, the physical system 150 may include or be a sensor, an actuator, such as an electric motor, a valve or a robot, an inverter supplying an electric motor, a gear box, a programmable logic controller (PLC), a communication gateway, and/or other parts or components relating to industrial automation products and industrial automation in general. The physical system 150 may be part of a complex production line or production plant, e.g., a bottle filing machine, conveyor, welding machine, welding robot, etc. In some examples, the physical system 150 may be a smartphone, smartwatch, handheld, pad, laptop or the like, or a desktop device, e.g., including desktop computers, or other "smart" devices, e.g., smart television sets, fridges, home or industrial automation devices, wherein smart television sets may e.g., be a television set with integrated Internet capabilities or a set-top box for television that offers more advanced computing ability and connectivity than a contemporary basic television set. Further, by way of example, the physical system 150 may include or be any machine, structure, or other items, including bridges, tunnels, roads, vehicles, and buildings, that may be engineered.

Examples of engineering systems that may be adapted to include the some of the engineering features described herein may include Simcenter Amesim, an application produced by Siemens Industry Software NV, of Leuven, Belgium, the NX suite of applications or Solid Edge applications produced by Siemens Industry Software Inc., of Plano, Texas, USA or the Totally Integrated Automation (TIA) Portal, an application produced by Siemens Aktiengesellschaft, of Munich, Germany. Examples of PLM systems that may be adapted to support the engineering features described herein may include the Active Workspace features of Teamcenter, an application produced by Siemens Industry Software Inc., of Plano, Texas, USA. Examples of ALM systems that may be adapted to support the engineering features described herein may include Polarion ALM, an application produced by Siemens Industry Software GmbH, of Zurich, Switzerland. The systems and methods described herein may be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

By way of example, the data processing system 100 may be cloud-based, internet-based and/or be operated by a provider providing engineering support. The user may be located close to the data processing system 100 or remote to the data processing system 100, e.g., anywhere else, e.g., using a mobile device for connecting to the data processing system 100, e.g., via the internet, wherein the user's device may include an input device 110 and a display device 112. In some examples, the data processing system 100, esp. the engineering system 118 and/or the product lifecycle management system 118', may be installed and run on a user's device, such as a computer, laptop, pad, on-premises computing facility, or the like.

It may be difficult and time-consuming to engineer a physical system 150 in complex, production engineering, PLM or ALM environments, for example to the engineer a physical system 150 with the aid of corresponding lifecycle information 130. For example, information relevant to the engineering of the physical system 150 may be incorporated in the lifecycle information 130 which in return might be spread in several, if not many lifecycle information documents. In some examples, such information relevant to the engineering of the physical system 150 may be included by large sets of lifecycle information 130. Providing such information relevant to the engineering of the physical system 150 to the engineering system may be challenging. Retrieving and providing such information relevant to the engineering of the physical system 150 from comprehensive lifecycle information 130 to the engineering system 118 may require many consciously and carefully performed manual steps which is an error-prone, slow, and not efficient process.

To enable the enhanced engineering of a physical system 150, the described data processing system 100 or, e.g., the engineering system 118, may include at least one input device 110 and at least one display device 112 (such as a display screen). The described processor 102 may be configured to generate a graphical user interface (GUI) 114 through the display device 112. Such a GUI may include GUI elements such as buttons, links, search boxes, lists, text boxes, images, scroll bars) usable by a user to provide inputs through the input device 110 that cause managing artifact information.

In some examples, the application software component 106 and/or the processor 102 may be configured to provide engineering information 120 in an engineering database 122, the engineering information 120 being related to physical, mechanical, electrical, electronic, hydraulic, thermal, control, electric power and/or process-oriented information of the physical system 150. The engineering database 122 may, by way of example, be included by the data store 108 of the engineering system 118 or of the data processing system 100. In some examples, the engineering information 120 may characterize the geometric shape, the surface quality, the stiffness, electric, magnetic and or thermal conductivity of the physical system 150. Further, the engineering information 120 may include information on controlling the physical system 150 or on controlling a process, e.g., a production process, using the physical system 150. The engineering information 120 may directly relate to the physical system 150 or to one or more components of the physical system 150.

In some examples, the engineering database 122 may be included by an engineering system 118.

By way of example, the application software component 106 and/or the processor 102 may further be configured to provide lifecycle information 130 in a lifecycle database 132, the lifecycle information 130 being related to the conception, requirements, uses cases, issues, design, realization and/or service information of the physical system 150. Herein, the conception may relate to information on the physical system 150 that has been created during the ideation, i.e., in an early phase of the creation of the physical system 150. The requirements may include or be a physical or functional need that the physical system 150 aims to satisfy. The requirements may, for example, describe any necessary (or sometimes desired) function, attribute, capability, characteristic, or quality of the physical system 150 for it to have value and utility to a customer, organization, internal user, or other stakeholder. By way of example, the requirements may define characteristics that the physical system 150 shall have or comply with, such as output power, maximum weight, surface quality, compliance with safety regulations, etc. Use cases of the physical system 150 may include a usage scenario for the physical system 150, such as the employment of the physical system 150 at a certain industrial environment, e.g., a conveyor, paper machine, etc. that may influence or determine certain properties or requirements of the physical system 150. Use cases may further include potential scenarios in which the physical system 150 receives an external request, such as user input or sensor or a control data and responds to it. Hence, such a potential scenario may involve a response function that the physical system 150 has in reply to given input data. Issues may, by way of example, relate to potential deficiencies or customer complaints with respect to the physical system 150 or functionalities or components of the physical system 150. Hence, such issues may also influence or determine certain properties or requirements of the physical system 150. Further, the design may relate to the geometrical, visual of physical appearance of the physical system 150. The design may further be or include a plan or specification for the construction of the physical system 150 or for the implementation of an activity or process relating to the physical system 150, or the result of that plan or specification in the form of a prototype, product, or process. Herein, the design may need to satisfy certain goals and constraints, such as the requirements, and may need to take into account aesthetic, functional, economic, or socio-political considerations, and is expected to interact with a certain environment. Examples of designs include architectural blueprints, engineering drawings, business processes, circuit diagrams, and sewing patterns. The realization may relate to the manufacturing or the production of the physical system 150 and, in some examples, include information on how to manufacture or produce the physical system 150 and how to achieve the desired characteristics of the physical system 150, such as surface quality so that compliance with the above-mentioned requirements may be achieved. Service information may describe how the physical system 150 needs to be serviced, e.g., which maintenance intervals apply, and which maintenance activities need to be carried out to allow for reliable and long-lived operation of the physical system 150.

In some examples, the lifecycle database 132 may be included by a product lifecycle management system 118' that may be different from the engineering system 118. Accordingly, the engineering database 122 may be different from the lifecycle database 132 that is stored in different data stores 108, 108', respectively. In further examples, the lifecycle database 132 may be stored in the same data store 108 than the engineering database 122 and the processor 102 may be used by both the engineering system 118 and the product lifecycle management system 118'.

Additionally, the lifecycle information 130 may include software documentation, software applications, complex data objects, work items, tasks, change requests, defects or test cases, source code of software products, images, videos, text, webpages, documentation, or any combination thereof, relating to the above-explained lifecycle information 130 of the physical system 150. Such lifecycle information 130 may, e.g., be used in the context of (agile) software or hardware development.

It should be appreciated that, in some examples, the described engineering information 120 may be tightly connected to the described lifecycle information 130 and vice versa. For example, changes to the engineering information 120 may, in many cases, require changes to the lifecycle information 130 and vice versa. Hence, there may be an interplay between the engineering information 120 and the lifecycle information 130 which reflects the fact that both the engineering information 120 and the lifecycle information 130 may characterize the physical system 150 or parts of it.

In some examples, the application software component 106 and/or the processor 102 may further be configured to display, by a display device 112, some of the engineering information 120 and some of the lifecycle information 130 of the physical system 150, respectively, in an engineering user interface (UI) 116.

The engineering UI 116 may, by way of example, be displayed to a user, e.g., in the above-mentioned GUI 114. Through the engineering UI 116 some or all the engineering information 120 and the lifecycle information 130 may be displayed to the user. In many examples, the engineering information 120 and the lifecycle information 130 may be comprehensive so that only some of this comprehensive information is displayed, e.g., according to a corresponding selection by the user. In some embodiments, the engineering information 120 and the lifecycle information 130 displayed in the engineering UI 116 relate to corresponding aspects of the physical system 150, e.g., a certain component of the physical system 150, certain engineering information 120 and its corresponding lifecycle information 130, such as CAD data or geometric dimensioning and tolerancing data as engineering information 120 and the corresponding requirements as lifecycle information 130. Further, in some examples, the GUI 114 or the engineering UI 116 may include a lifecycle UI 116' as a sub-UI, wherein some of the lifecycle information 130 may be displayed in this lifecycle UI 116'.

In some examples, the application software component 106 and/or the processor 102 may further be configured to capture a user's input relating to an import of selected lifecycle information 134 from the lifecycle database 132 to the engineering database 122 in response to user interactions with the engineering UI 116.

The user may select some of the lifecycle information 132, e.g., some of the displayed lifecycle information 130, and may want to import the selected lifecycle information 134 from the lifecycle database 132 to the engineering database 122. To this end, the user may interact with the engineering UI 116 and provide corresponding input, e.g., via the input device 110.

By way of example, the application software component 106 and/or the processor 102 may further be configured to generate a connector 140 for importing the selected lifecycle information 134 from the lifecycle database 132 to the engineering database 122.

The connector 140 may, e.g., allow for an input of the selected lifecycle information 134 from the lifecycle database 132 to the engineering database 122. In some examples, the connector 140 may be understood as an object or a piece of data or software that connects the selected lifecycle information 134 or the memory address at which the selected lifecycle information 134 is stored in the lifecycle database 132 on the one hand with the engineering database 122 or the memory address at which the selected lifecycle information 134 is to be stored in the engineering database 122 on the other hand. In some examples, generating the connector 140 may be understood as retrieving or downloading the connector 140 or parts of the connector 140 from the product lifecycle management system 118' or the lifecycle database 132.

In some examples, the application software component 106 and/or the processor 102 may further be configured to import the selected lifecycle information 134 from the lifecycle database 132 to the engineering database 122 using the generated connector 140.

The selected lifecycle information 134 may, by way of example, be transmitted or downloaded from the lifecycle database 132 to the engineering database 122 by using the generated connector 140. By way of example, the imported, selected lifecycle information 134 may then be stored in the engineering database 122.

By way of example, the application software component 106 and/or the processor 102 may further be configured to determine further engineering information 124 of the physical system 150 using the lifecycle information 134 selected by the user and imported from the lifecycle database 132 to the engineering database 122.

The selected and imported lifecycle information 134 may then be used, for example together with other engineering information 120 already stored in the engineering database 122, to determine further engineering information 124. This determination may, by way of example, be done by the engineering system 118 by applying engineering functionalities on the selected and imported lifecycle information 134 and on the other engineering information 122.

In some examples, e.g., if a new or amended requirement corresponds to the selected and imported lifecycle information 134, the further engineering information 124 may replace an older engineering data 120. For instance, the geometrical length of the physical system 150 may be amended by amending the corresponding requirement and hence by amending the corresponding lifecycle information 130 in the lifecycle database 132. This amendment may then be selected and imported to the engineering database 122 as the selected and imported lifecycle information 134 and the corresponding engineering information 120 (or parts of it) may be updated to the further engineering information 124 which reflects the amended geometrical length of the physical system 150. Such amendments to the lifecycle information 130 may involve a rather simple determination of the further engineering information 124, such as amending geometrical properties of a simple physical system 150, or may involve an advanced determination of the further engineering information 124, e.g., based on an amended stiffness requirement of the physical system 150 as selected and imported lifecycle information 134, determining an amended geometrical shape or an amended material of the physical system 150 to comply with the amended stiffness requirement. Similarly, new lifecycle information 130, i.e., lifecycle information 130 without a predecessor, may be selected and imported as the selected lifecycle information 134 and corresponding further engineering information 124 may be determined. Creating amended or new lifecycle information 130 that is then imported to the engineering database 122 as selected lifecycle information 134 may apply in various technical domains, such as the above-mentioned example of electronic design automation, e.g., by updating the design of an integrated circuit through the determination of the further engineering information 124 upon import of selected lifecycle information 134, such as the use of a certain processor, the change of boundary conditions, e.g., with respect to available chip space, allowable maximum operation temperature, etc.

In some examples, if the above-mentioned test cases are imported as selected lifecycle information 134 to the engineering database 122, the test cases may be used, e.g., executed or run, to determine the further engineering information 124. The mentioned execution or run may be done by the engineering system 118, e.g., to generate a test report that may, e.g., compare the output of the mentioned test, e.g., a simulation of the physical system 150, to a baseline of the physical system 150. This approach may, in some examples, be used for verification, e.g., automatic verification, of the physical system 150, of some of the engineering information 120 of the physical system 150, or of some of the lifecycle information 130 of the physical system 150.

By way of example, the application software component 106 and/or the processor 102 may further be configured to store the determined further engineering information 124 in the engineering database 122.

In further embodiments, the generated connector 140 may include a Uniform Resource Locator (URL), a Uniform Resource Identifier (URI) and/or a Requirements Interchange Format (ReqIF) element.

A Uniform Resource Identifier (URI) may be understood as a unique sequence of characters that identifies a logical or physical resource used by web technologies. URIs may be used to identify information resources such as web pages or databases. Some URIs provide locating and retrieving information resources on a network (either on the Internet or on another private network, such as a computer filesystem or an Intranet); these may be Uniform Resource Locators (URLs) that are described in more detail below. A URI may identify the resource by name at the specified location or URL. The web technologies that use URIs are not limited to web browsers. URIs are used to identify anything described using the Resource Description Framework (RDF), for example, concepts that are part of an ontology defined using the Web Ontology Language (OWL).

A Uniform Resource Locator (URL), colloquially termed a web address, may be a reference to a web resource that specifies its location on a computer network and a mechanism for retrieving it. A URL is a specific type of Uniform Resource Identifier (URI). URLs occur most commonly to reference web pages (http) but are also used for file transfer (ftp), email (mailto), database access (JDBC), and many other applications. In some examples, the connector 140 may, e.g., include a parser for a URL that may, by way of example, be used to analyze some of the lifecycle information 130 or metadata relating to the lifecycle information 130 with respect to a string of symbols, either in natural language, computer languages or data structures. Such a parser may be used to extract or derive a URL from the lifecycle information 130 or metadata relating to the lifecycle information 130.

The Requirements Interchange Format (RIF or ReqIF) is an XML file format that may be used to exchange requirements, along with its associated metadata, between software tools from different vendors. The requirements exchange format also defines a workflow for transmitting the status of requirements between partners. Although developed in the automotive industry, ReqIF is suitable for lossless exchange of requirements in any industry.

The connector 140 may make use or includes of a URI, URL and/or an ReqIF element to allow for import of the selected lifecycle information 134 from the lifecycle database 132 to the engineering database 122. By way of example, such a connector 140 may include the web address and/or memory address of the lifecycle database 132 or of the selected lifecycle information 134 stored in the lifecycle database 132. Such a connector 140 may further include the web address and/or memory address of the engineering database 122 and for example the web address and/or memory address to which the selected lifecycle information 134 is to be imported.

In some examples, the connector 140 including a URI, a URL or a ReqIF element may require that both the engineering database 122 and the lifecycle database 132 are online or available for communication or a data transfer. In further examples, the connector 140 may allow for the desired import using a ReqIF element for example with a unique identifier. In such examples, the ReqIF element including the selected lifecycle information 134 may first be exported from the lifecycle database 132 (when the lifecycle database 132 is available for communication) and then be imported to the engineering database 122 (when the engineering database 122 is available for communication). Connectors 140 including a URI, a URL or a ReqIF element may therefore, in some examples, be used for synchronous communication, whereas connectors 140 including a ReqIF element may be used for asynchronous communication between the lifecycle database and the engineering database 122, respectively.

In some examples, the lifecycle information 130 may include a plurality of thousands of lifecycle information items 136, and the application software component 106 and/or the processor 102 may further be configured to capture the user's input relating to an import of less than ten percent of the plurality of thousands of lifecycle information items 136 as the selected lifecycle information 134.

In many examples, the lifecycle information 130 stored in the lifecycle database 132 may be very comprehensive and, e.g., include several thousand, tens or hundreds of thousands or many more single lifecycle information items 136. This may be the case for more complex physical systems, e.g., including several or many components, needing to comply with many different, fine granular requirements, having complex functionalities, etc. The lifecycle information items 136 may each describe or characterize certain lifecycle aspects of the physical system, such as very detailed information on the requirements, the design, or other lifecycle information 130 described above.

The user may provide their input relating to an import of one, several or many of the lifecycle information items 136, but less than 10% of the plurality of thousands of lifecycle information items 136. Hence not all of the thousands of lifecycle information items 136 and, e.g., not the complete lifecycle database 132 or all lifecycle information 130 of the physical system 150 stored in the lifecycle database 132 may be selected by the user for import. This user input may be captured and the corresponding connector 140 may be generated to allow for the import of the selected lifecycle information items 136.

The connector 140 may be advantageous for the import of the selected lifecycle information 134 including less than ten percent of the plurality of thousands of lifecycle information items 136. The connector 140 may considerably speed up the import of the selected lifecycle information 134 compared to a complete import of all lifecycle information 130. Further, the connector 140 may allow to require considerably less user interaction and user input to manage or trigger the import of the selected lifecycle information 134 than required with other approaches.

By way of example, the lifecycle information 130 may include a plurality of thousands of lifecycle information items 136, wherein the lifecycle information 130 includes a plurality of thousands of lifecycle information items 136. The physical system 150 is characterized by at least one characteristics, the respective characteristics including at least one of a structure, a hierarchy, a model, a property, or a component of the physical system 150, respectively. The lifecycle information 130 and for example the engineering information 120 is further related to the respective characteristics. The application software component 106 and/or the processor 102 may further be configured to display a UI element 146 allowing the user to select at least one of the respective characteristics of the physical system 150 in the engineering UI 116; capture the user's input relating to a selection of at least one of the respective characteristics; and determine the lifecycle information items 136 as the lifecycle information 134 corresponding to the selected characteristics.

In some examples, the lifecycle information 130 may be displayed to the user according to a structure or hierarchy which characterizes the physical system 150, such as a category of lifecycle information 130 for different engineering domains, such as physics, mechanics, electrics, electronics, hydraulics, etc. The mentioned structure or hierarchy characterizing the physical system 150 may also be related to components, sub-components, sub-sub-components, etc. of the physical system 150. In some examples, the mentioned component may also directly be included by the mentioned characteristics of the physical system 150. Further, the mentioned structure or hierarchy characterizing the physical system 150 may also be related to types of lifecycle information 130 such as, requirements, use cases, design, etc. of the physical system 150.

Further, combinations of the above-mentioned examples of the mentioned structure or hierarchy characterizing the physical system 150 may also be displayed to the user to facilitate selecting particularly interesting lifecycle information 130 for import: e.g., there may be a structure or hierarchy involving on level 1 its different (sub-)components, on level 2 the requirements or designs of the respective (sub-)component, on level 3 the requirements with respect to mechanics or electronics of the respective (sub-)component, etc. Using the mentioned structure or hierarchy, large sets of lifecycle information 130 may be classified and displayed in a structured manner to the user so that the user may select sets of relevant lifecycle information 130 which is relating to the aspect of the physical system 150 in which the user is interested in, e.g., the user selecting all lifecycle information 130 relating to the mechanics requirements of sub-component 3-B.

In further embodiments, a model of the physical system 150 may be a simplified physical or mathematical model of the physical system 150 that may reproduce the main physical properties of the physical system 150. The mentioned property or properties may include physical, mechanical, electrical, electronic, hydraulic, thermal, etc. properties of the physical system 150, e.g., an electric resistance, for example depending on other parameters, like temperature, radiation, etc.

The displayed UI element 146 may, e.g., be or include a hierarchical drill down navigation, a hierarchical multi-level navigation or a tree navigation. The user may provide their input, e.g., by selecting the structure(s) and/or hierarchy(ies) of the physical system 150 in which the user is interested in. The lifecycle information 130 corresponding to the user's selection may then be determined to be the selected lifecycle information 134 that is to be imported to the engineering database 122.

In some examples, there may be a search UI item, such as a search bar, that may provide a preview of the found lifecycle information 130 corresponding to the search or filter criteria that may be input by the user via the search UI item. This search UI item may be displayed in the engineering UI 116. Such user input may, for example, be one or several of the above-mentioned characteristics of the physical system 150.

The connector 140 may be advantageous for the import of the selected lifecycle information 134 corresponding to the selected item or level of the structure or the hierarchy. The connector 140 may considerably speed up the import of the selected lifecycle information 134 compared to a complete import of all lifecycle information 130. Further, the connector 140 may require considerably less user interaction and user input to manage or trigger the import of the selected lifecycle information 134 than required with other approaches.

In some examples, the lifecycle information 130 may include a plurality of thousands of lifecycle information items 136. The lifecycle information 130 may be characterized by at least one lifecycle information property. The application software component 106 and/or the processor 102 may further be configured to: display a further UI element allowing the user to select at least one of the respective lifecycle information property in the engineering UI 116; capture the user's input relating to a selection of at least one of the respective lifecycle information property; and determine the lifecycle information items 136 as the lifecycle information 134 corresponding to the selected, respective lifecycle information property.

In some examples, the lifecycle information property may include the certain attribute of the corresponding lifecycle information 130 or the corresponding lifecycle information item 136, such as "has parent", "implemented", "unresolved", etc. The user may provide their input and indicate a selection of, e.g., the lifecycle information property "implemented" so that all lifecycle information 130 with this property "implemented" may be selected and then be imported from the lifecycle database 130 to the engineering database 120. Further, the lifecycle information property may indicate a certain level of a structure or a hierarchy of the lifecycle information 130. By way of example, the lifecycle information 130 may be structured as follows and include several lifecycle information items 136 "LCI": level 1 LCI1 "Car Light Requirements"; level 2 LCI2 "Head Lights"; level 3 LCI3 "High Beam"; level 4 LCI4 "The high beam is activated if the user presses the high beam lever in the light mode switch is set to full light mode." and LCI5 "The high beam is deactivated temporarily if incoming traffic is detected by the camera.". If the user selects level 2, the lifecycle information items 136 LCI2 is determined as the selected lifecycle information 134. If the user selects level 4, the lifecycle information items 136 LCI4 and LCI5 are determined as the selected lifecycle information 134.

In further embodiments, the lifecycle information property may be used to prioritize the import of the selected lifecycle information 134 from the lifecycle database 132 to the engineering database 122. This may, for example, be achieved by assigning a priority identifier to certain lifecycle information items 136 among the selected lifecycle information 134, e.g., through a selection of the user using suitable UI items and corresponding user interaction. Such prioritized selected lifecycle information items 136 with a priority identifier may then first be imported from the lifecycle database 132 to the engineering database 122 before the other selected lifecycle information 134 is imported.

Like in the previous embodiment, the connector 140 may be advantageous for the import of the selected lifecycle information 134 corresponding to the selected item or level of the structure or the hierarchy.

In further examples, if a plurality of the lifecycle information items 136 has been selected for import from the lifecycle database 132 to the engineering database 122, the generated connector 140 may include one URL for all the selected lifecycle information items 136 and one URI for each selected lifecycle information item 136.

By including one URL for all selected lifecycle information items 136 and one URI for each selected lifecycle information item 136, the connector allows for a particularly convenient import of the selected lifecycle information 134. The user only may need to make their selection, for example push a button to trigger the import, and then the import may conveniently be done, e.g., without further required user interaction. Such a connector 140 may make sure that all the selected lifecycle information items 136 are reliably imported from the lifecycle database 132 to the engineering database 122 and further, this connector may make sure that this import may be fast and convenient for the user since no additional, unneeded lifecycle information items 136 are imported and no further user interaction may be required.

In some embodiments, determining the further engineering information 124 may include that the application software component 106 and/or the processor 102 may further be configured to engineer, model, simulate and/or analyze the physical system 150 using the engineering information 120 and the imported, selected lifecycle information 134 to determine the further engineering information 124.

Hence, in some examples, a simulation of the physical system 150 may be carried out taking into account the engineering information 120 and the imported, selected lifecycle information 134. The imported, selected lifecycle information 134 may, e.g., relate to an amended requirement of the physical system 150, such as a lower weight, smaller size, a higher output power, etc., of the physical system 150. This amended requirement may, in some examples, be used as a boundary condition which the physical system 150 may need to comply with and one or more simulations may be run, e.g., with varying engineering information 120 to find amended engineering information including the further amended engineering information 124 that characterizes a physical system 150 complying with the amended requirement and hence, with the imported, selected lifecycle information 134. Analogously, modeling, analyzing, or engineering the physical system 150 may be done taking into account the amended requirement and hence, the imported, selected lifecycle information 134, in order to obtain amended engineering information including the further engineering information 124 that characterizes a physical system 150 complying with the amended requirement and hence, with the imported, selected lifecycle information 134.

Engineering, modeling, simulating and/or analyzing the physical system 150 may, by way of example, include considering the time-varying behavior of the dynamical, physical system 150. Such physical systems 150 may, e.g., be described by ordinary differential equations or partial differential equations. A simulation or calculation run may solve the state-equation system to find the behavior of the state variables over a specified period of time. The equation(s) may be solved through numerical integration methods to produce the transient behavior of the state variables. Simulation of dynamic physical systems 150 may predict the values of model-system state variables, as they are determined by the past state values. This relationship may be described or characterized by an according model of the physical system 150.

In further examples, the application software component 106 and/or the processor 102 may further be configured to display the engineering UI 116 to the user in a web browser, esp. embedded web browser.

A web browser, commonly referred to as a browser, may be understood as application software for accessing the World Wide Web. When a user follows the URL of a web page from a particular website, the web browser may retrieve the necessary content from the website's web server and then display the page on the user's device, e.g., a laptop, smartphone, etc.

In some examples, the engineering functionalities of the engineering system 118 may be provided to the user as a web-based engineering application. The engineering UI 116 may then conveniently be displayed in the web browser. In other examples, the engineering functionalities of the engineering system 118 may be provided to the user as a desktop app, e.g., an application which is locally installed and run on the user's device, e.g., their laptop, smartphone, etc. In such cases, the engineering UI 116 may be displayed to the user in an embedded web browser as a functionality included by the locally installed and run desktop engineering application.

Analogous scenarios may exist for the lifecycle functionalities of the product lifecycle management system 118': the lifecycle functionalities of the product lifecycle management system 118' may be provided to the user as a web-based lifecycle application. There may be a lifecycle UI 116' (that may be included by or be identical with the engineering UI 116) that may then conveniently be displayed in the web browser. In other examples, the lifecycle functionalities of the product lifecycle management system 118' may be provided to the user as a desktop app, e.g., an application which is locally installed and run on the user's device, e.g., their laptop, smartphone, etc. In such cases, the lifecycle UI 116' may be displayed to the user in an embedded web browser as a functionality included by the locally installed and run desktop lifecycle application.

In some examples, if the engineering functionalities of the engineering system 118 and/or the lifecycle functionalities of the product lifecycle management system 118' are provided to the user as a web-based engineering or lifecycle application, the connector 140 may include a delegated URI.

This approach may help to prevent cross-site request forgery and may involve delegating URI permissions from one application, e.g., engineering application of the engineering system 118, to the other application, e.g., the lifecycle application of the product lifecycle management system 118', or vice versa. It may also involve other applications to/from which the URI permissions may be delegated. Access, e.g., to the selected lifecycle information 134 or the engineering database 122, may, in some examples, only be granted if the application trying access the desired data has permissions to do so.

Herein, cross-site request forgery, also known as one-click attack or session riding and abbreviated as CSRF or XSRF, may be a type of malicious exploit of a website where unauthorized commands are submitted from a user that the web application trusts. Unlike cross-site scripting (XSS), which exploits the trust a user has for a particular site, CSRF exploits the trust that a site has in a user's browser.

In some examples, the connector 140 that has already been generated for the import of the selected lifecycle information 134 may be used later to update this selected lifecycle information 134, and for example the additional engineering information which has been determined using the imported and selected lifecycle information 134. In further examples, an identifier may be assigned to the imported and selected lifecycle information 134 that may, by way of example, be used along with connector 140. The connector 140 may, e.g., also include this identifier. In further examples, the assignment of the mentioned identifier may be done by the product lifecycle management system 118' or the engineering system 118. The identifier may, e.g., be used by the user to open and for example display the respective imported and selected lifecycle information 134 in the product lifecycle management system 118'.

In some embodiments, the application software component 106 and/or the processor 102 may further be configured to import amended, selected lifecycle information 134 from the lifecycle database 132 to the engineering database 122 and determine updated further engineering information 124 of the physical system 150 upon amendment of the selected lifecycle information 134 in the lifecycle database 132.

The lifecycle information 130 may, in some examples, be amended by the user so that amended, selected lifecycle information 134 may be created. Such amendments may, e.g., be made during the requirements engineering or during the development of the physical system 150. If such amended, selected lifecycle information 134 is generated, it may, in some embodiments, automatically be imported from the lifecycle database 132 to the engineering database 122. The imported, amended, selected lifecycle information 134 may then be used, e.g., by the engineering functionalities of the engineering system 118 to determine updated further engineering information 124 of the physical system 150. This sort of automatic update mechanism may help to keep the engineering information 120 including the further engineering information 124 stored in the engineering database 122 up to date and in compliance with the lifecycle information 130 stored in the lifecycle database 132.

In some examples, the user may make a selection according to which the selected lifecycle information 134 may be used for such an automatic update mechanism. To this end, an additional UI element may be displayed in the engineering UI 116 and the user may provide their input relating to this additional UI element that may indicate that the user selects an automatic update of the further engineering information 124 if the selected lifecycle information 134 is amended or updated.

By way of example, the connector 140 allowing for the import of the selected lifecycle information 134 from the lifecycle database 132 to the engineering database 122 may also be used for this described automatic update mechanism. In some examples, the previously generated connector 140 may be checked to ensure a reliable import of the amended, selected lifecycle information 134 from the lifecycle database 132 to the engineering database 122. If this check fails, and this reliable import may not be guaranteed, a new connector 140 may be generated allowing for importing the amended, selected lifecycle information 134 from the lifecycle database 132 to the engineering database 122. Such failed checks requiring the generation of new connector 140 may, e.g., occur if the web address and/or memory address of at least one of the selected lifecycle information 134, the lifecycle database 132, or the engineering database 122 has changed in the meantime. Further, such checks may fail in some examples, due to amendments of the lifecycle information 130, such as the deletion, move or creation of lifecycle information 130 or lifecycle information items 136. In further examples, the connector 140 may be generated afresh, e.g., discarding previously generated connectors and e.g., avoiding the need to carry out the mentioned check.

In some examples, such automatic updates may be triggered by certain events which are not limited to the amendment of the selected lifecycle information 134, but further including, e.g., the acceptance, the freeze, or the release of a version of the lifecycle information 130. In further examples, such automatic updates may be triggered by successfully completing a consistency check of the lifecycle information 130.

By way of example, the application software component 106 and/or the processor 102 may further be configured to: provide additional engineering information in the engineering database 122, the additional engineering information being related to physical, mechanical, electrical, electronic, hydraulic, thermal, control, electric power and/or process-oriented information of the physical system 150; generate an additional connector for importing the additional engineering information from the engineering database 122 to the lifecycle database 132; import the additional engineering information from the engineering database 122 to the lifecycle database 132 using the additional, generated connector; determine further lifecycle information of the physical system 150 using the additional engineering information imported from the engineering database 122 to the lifecycle database 132; and store the determined further lifecycle information in the lifecycle database 132.

In some examples, the physical system 150 may be engineered in the engineering system 118 such that the engineering information 120 may be extended and additional engineering information may be provided or generated, e.g., via a user interaction or user input through the engineering UI 116. In such examples, no lifecycle information 130 corresponding to the additional engineering information may yet be available in the lifecycle database 132. According to the suggested example, such corresponding lifecycle information 130, for example the further lifecycle information may be generated by, firstly, generating an additional connector to import the additional engineering information from the engineering database 122 to the lifecycle database 132. Using the imported, additional engineering information, the further lifecycle information of the physical system 150 may be determined, e.g., by the product lifecycle management system 118'. The determined further lifecycle information may correspond to the imported, additional engineering information. Eventually, the determined further lifecycle information may be stored in the lifecycle database 132.

In some examples, the determined further lifecycle information may then be imported from the lifecycle database 132 to the engineering database 122 using the import functionality described above.

In further examples, the further lifecycle information may include a surrogate lifecycle information that includes amendments or updates to the lifecycle information item 136 to which the additional engineering information relates. In such examples, the lifecycle information item 136 to which the additional engineering information relates may be immovable or unchangeable. Using the surrogate lifecycle information, amendments, or updates to immovable or unchangeable lifecycle information items 136 may be documented or stored. By way of example, the further lifecycle information may further include a link or hyperlink to the additional engineering information and/or the lifecycle information item 136 to which the additional engineering information relates.

In some embodiments, the application software component 106 and/or the processor 102 may further be configured to measure or determine the engineering information 120 of the physical system 150, e.g., using a sensor, CAD data, communication data, etc. relating to the physical system 150.

By way of example, the engineering information 120 and, for example, the additional engineering information may be measured or determined using a sensor that may, e.g., be suitable to measure or determine the respective engineering information 120, such as mechanical, thermal, etc. information of the physical system 150. Further, the engineering information 120 and, for example, the additional engineering information may be measured or determined using CAD data that may, e.g., determined, and in some cases read in, using a specification plate, e.g., an electronic specification plate, of the physical system 150. Herein, the (electronic) specification plate may include the CAD data or a sort of link that allows accessing or downloading of the CAD data. In further examples, the engineering information 120 and, for example, the additional engineering information may be measured or determined using communication data of the physical system 150 which is communicatively coupled to another device. Herein, the communication data may, e.g., be used to determine control information or process-oriented information of the physical system 150.

In some examples, the engineering information 120 and, for example, the additional engineering information may be measured or determined using the respective (real) physical system 150 as indicated in FIG. 1 with the dashed line connecting the processor 102 of the engineering system 118 with the physical system 150.

In some examples, the application software component 106 and/or the processor 102 may further be configured to display the determined further engineering information 124 to the user in the engineering UI 116; and/or analyze, monitor, operate, control, and/or produce the physical system 150 using to the engineering information 120 and the further engineering information 124.

By way of example, the engineering information 120 and the further engineering information 124 and the additional engineering information may be used to analyze or monitor the physical system 150, e.g., to indicate whether the physical system 150 is working properly or the physical system 150 is monitoring a production step which is working properly. In some examples, the mentioned engineering information and the further engineering information 124 and the additional engineering information may indicate that the physical system 150 is damaged or that there may be problems with the production step which is monitored by the physical system 150. In other examples, the engineering information 120 and the further engineering information 124 and the additional engineering information may be used to operate or control the physical system 150, e.g., implementing a feedback loop or a control loop using input data of the physical system 150, analyzing the input data by applying the physical system's 150 functionalities or properties on the input data, and controlling or operating the physical system 150 based on the input data. In further examples, the physical system may be produced, e.g., manufactured, using the engineering information 120 and the further engineering information 124 and the additional engineering information.

In some examples, the engineering information 120 and the further engineering information 124 may be used to analyze, monitor, operate, control and/or produce the physical system 150 as indicated in FIG. 1 with the dashed line connecting the processor 102 of the engineering system 118 with the physical system 150.

The engineering information 120 and the further engineering information 124 may be compiled, e.g., by the engineering system 118, and then be flashed on an electronic control unit (ECU) or processor included by the physical system 150. Herein, flashing on the ECU or processor may be understood as copying or downloading the compiled the engineering information 120 including the further engineering information 124 to the ECU or the processor, e.g., a memory or data store included the ECU or processor to allow for executing the compiled engineering information 120 including the further engineering information 124. The ECU or the processor and the physical system 150 may then be operated according to the compiled and flashed engineering information 120 including the further engineering information 124.

In further examples, amendments made to the engineering information 120 in the engineering database 122 and/or to the lifecycle information 130 in the lifecycle database 132 may be documented such that it may be retraced which user made which amendments when. In some embodiments, a user of the engineering system 118 or the engineering database 122 may only import of selected lifecycle information 134 if this user has sufficient access rights to the lifecycle information 130 or the lifecycle database 132.

The described the application software component 106 and/or the processor 102 may carry out an analogous method of facilitating engineering a physical system 150, for example engineering a physical system 150 with the aid of corresponding lifecycle information 130.

Further, a computer-readable medium 160 that may include a computer program product 162 is shown in FIG. 1. The computer program product 162 may be encoded with executable instructions, that when executed, cause the computer system 100 or and/or the artifact information management system 118 to carry out the described method.

Figure 2:
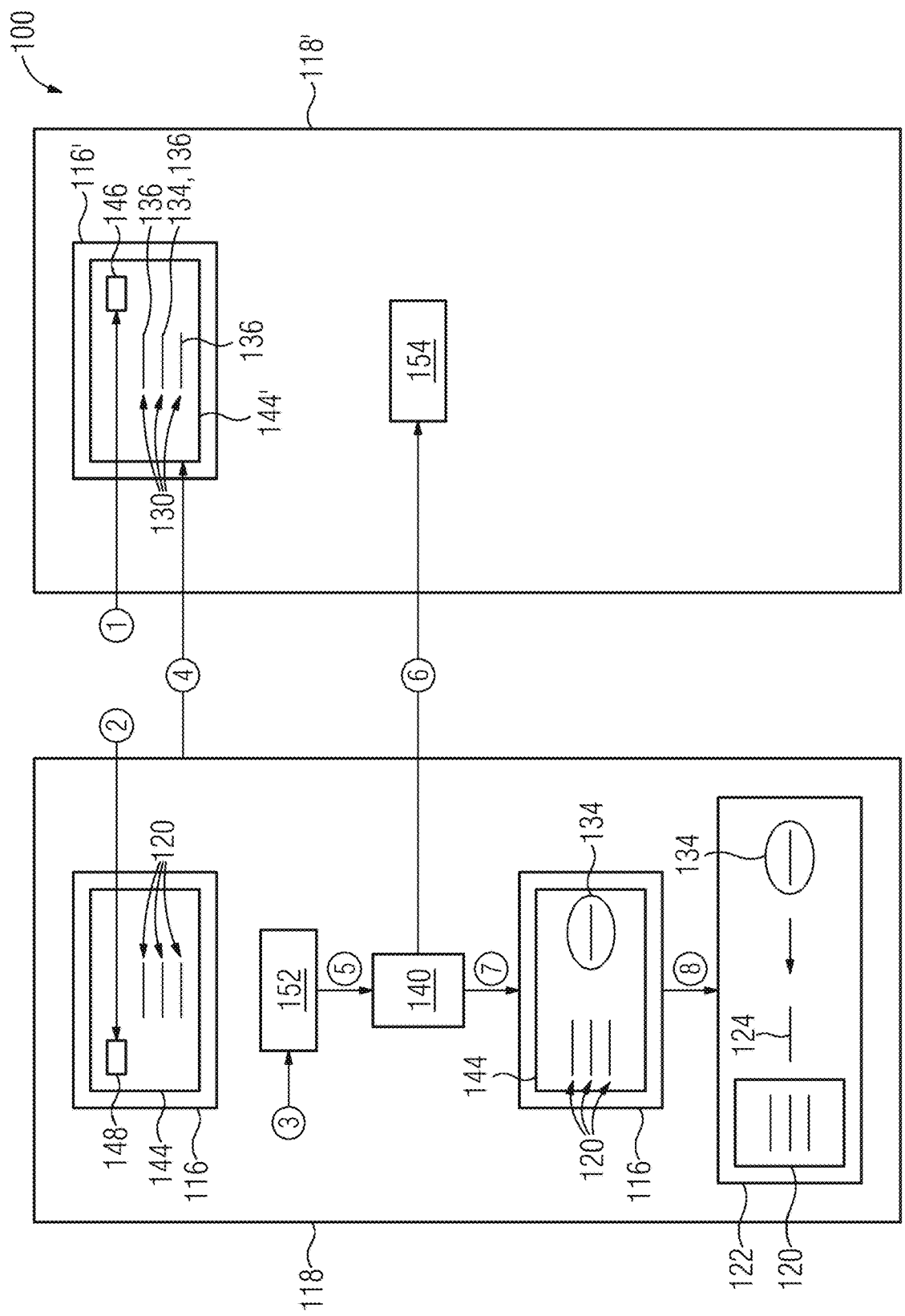
FIGS. 2 and 3 depict a flow diagram of an example methodology that engineering a physical system, for example engineering a physical system with the aid of corresponding lifecycle information, in a product system according to an embodiment.

Referring now to FIG. 2, a flow diagram of an example methodology is depicted that facilitates engineering a physical system 150, for example engineering a physical system 150 with the aid of corresponding lifecycle information 130.

The depicted methodology may include several steps that relate to an interplay of the engineering system 118 with the engineering UI 116 on the one hand and the product lifecycle management system 118' with the lifecycle UI 116' on the other hand. The methodology may include step 1 during which the user may select some of the lifecycle information 130 or lifecycle information items 136 which is/are displayed in the lifecycle UI 116' and which is/are stored in the lifecycle database 132. The selection may be done by the user using or activating the UI element 146. The overall data processing system 100, the engineering system 118 and/or the product lifecycle management system 118' may capture the user's input relating to an import of selected lifecycle information 134. Herein, the overall data processing system 100 may include the engineering system 118 and the product lifecycle management system 118'.

The methodology may further include step 2 during which the user may provide their input to import the selected lifecycle information 134, e.g., using the UI element 148 displayed in the engineering UI 116 along with some of the engineering information 120. In some examples, the lifecycle UI 116' and/or the engineering UI 116 may be displayed to the user in one common embedded browser or a respective embedded browser 144', 144.

The methodology may further include step 3 during which the engineering system 118 may initiate a script 152, e.g., including a call-back script, which triggers or carries out some of the subsequent steps. For example, the methodology may further include step 4 that may be carried out by the script 152. During step 4, the engineering system 118 may connect to the product lifecycle management system 118', e.g., the embedded browser 144' of the product lifecycle management system 118', to support determining an/or generating a connector 140. In some examples, the URL of the selected lifecycle information 134 may be obtained from the product lifecycle management system 118' and be transmitted to the engineering system 118. This URL may be included by or be the connector 140.

Using the information retrieved by the engineering system 118 from the product lifecycle management system 118', the script may, during step 5, generate the connector 140. In some examples, the connector 140 may be parsed to identify the query of the user, e.g., which of the lifecycle information 130 has been selected as selected lifecycle information 132, the look and feel parameters of the lifecycle information 130 or the selected lifecycle information 134, e.g., whether the lifecycle information 130 is structured in a tree or flat, links to follow, etc.

The methodology may further include step 6 during which the engineering system 118 may run WebServices to collect final data, e.g., import the selected lifecycle information 134, using the connector 140. To this end, the engineering system 118 may connect with a WebServices Engine of the product lifecycle management system 118' to collect the mentioned data.

The methodology may further include step 7 during which the retrieved, selected lifecycle information 134 may be populated in the engineering UI 116. Further, the methodology may include step 8 during which the retrieved, selected lifecycle information 134 may be stored in the engineering database 122 and may further be used to determine further engineering information 124 that may also be stored in the engineering database 122. in some examples, step 8 may also be carried out prior or in parallel to step 7. Further, the determined further engineering information 124 may also be displayed to a user using the engineering UI 116.

Figure 3:
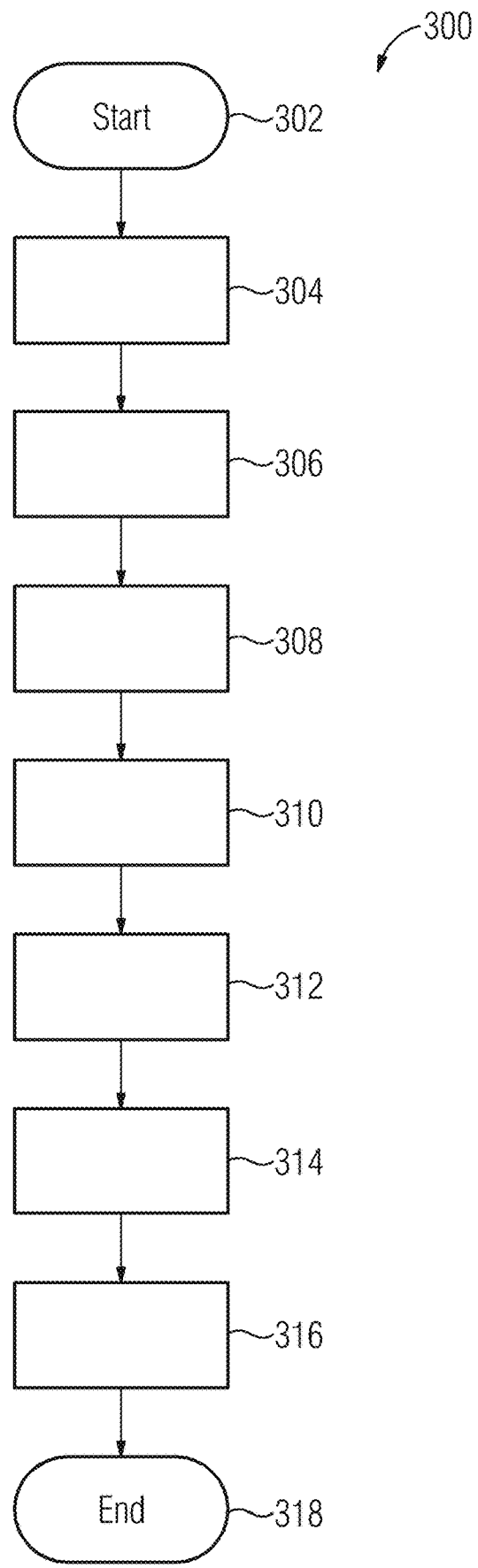

Referring now to FIG. 3, a flow diagram of an example methodology 300 is depicted that facilitates engineering a physical system 150, for example engineering a physical system 150 with the aid of corresponding lifecycle information 130. The methodology 300 may start at 302 and may include several acts carried out through operation of at least one processor.

These acts may include an act 304 of providing engineering information 120 in an engineering database 122, the engineering information 120 being related to physical, mechanical, electrical, electronic, hydraulic, thermal, control, electric power, and/or process-oriented information of the physical system 150; an act 306 of providing lifecycle information 130 in a lifecycle database 132, the lifecycle information 130 being related to the conception, requirements, uses cases, issues, design, realization, and/or service information of the physical system 150; an act 308 of displaying, by a display device 112, some of the engineering information 120 and some of the lifecycle information 130 of the physical system 150, respectively, in an engineering user interface (UI) 116; an act 310 of capturing a user's input relating to an import of selected lifecycle information 134 from the lifecycle database 132 to the engineering database 122 in response to user interactions with the engineering UI 116; an act 312 of generating a connector 140 for importing the selected lifecycle information 134 from the lifecycle database 132 to the engineering database 122; an act 314 of importing the selected lifecycle information 134 from the lifecycle database 132 to the engineering database 122 using the generated connector 140; and an act 316 of determining further engineering information 124 of the physical system 150 using the lifecycle information 134 selected by the user and imported from the lifecycle database 132 to the engineering database 122. At 318 the methodology may end.

The methodology 300 may include other acts and features discussed previously with respect to the computer-implemented method of engineering a physical system 150, for example engineering a physical system 150 with the aid of corresponding lifecycle information 130.

Figure 4:
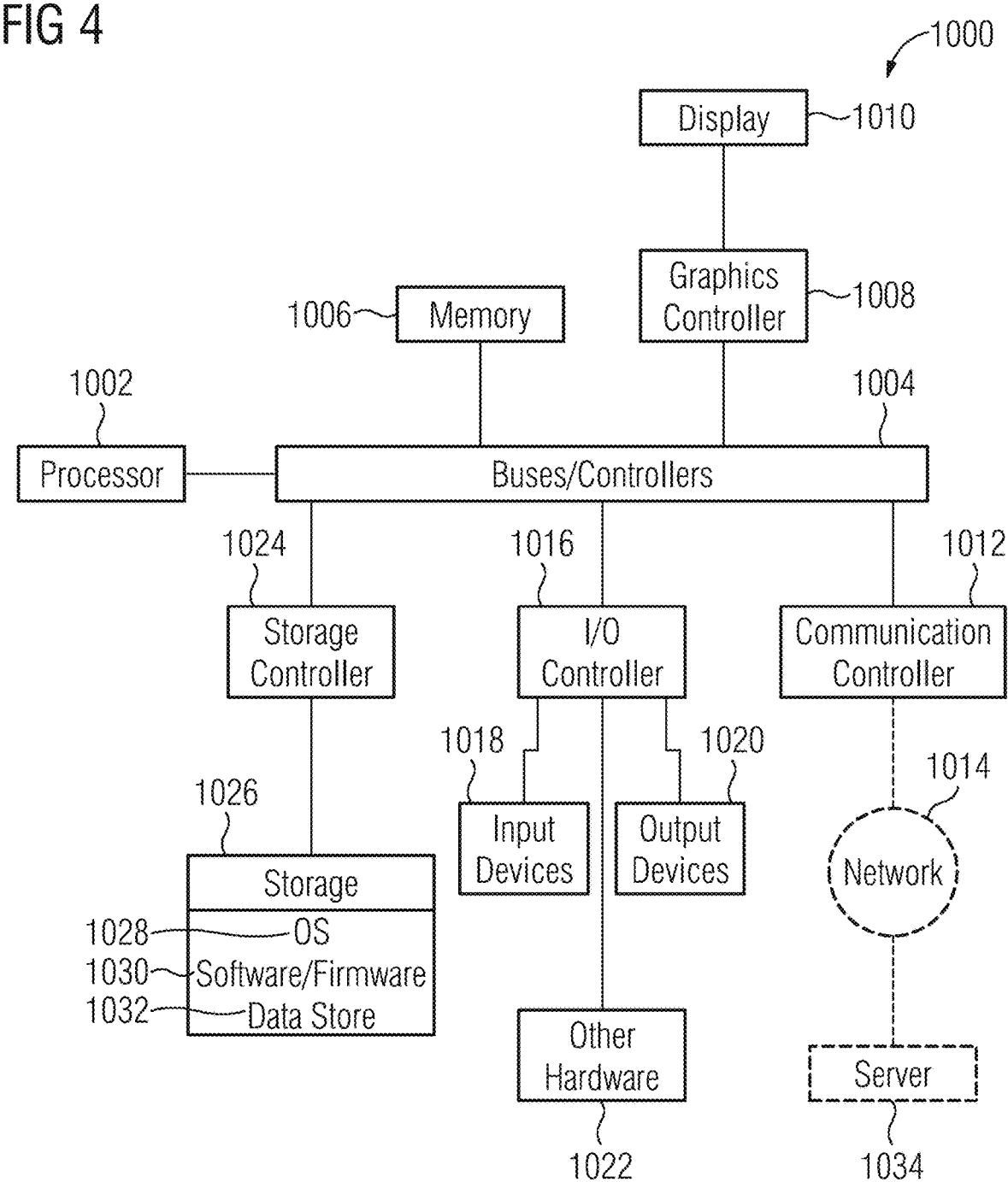
FIG. 4 depicts a block diagram of a data processing system in which an embodiment may be implemented.

FIG. 4 depicts a block diagram of a data processing system 1000 (also referred to as a computer system) in which an embodiment may be implemented, for example, as a portion of a product system, and/or other system operatively configured by software or otherwise to perform the processes as described herein. The data processing system 1000 may include, for example, the computer or IT system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. In some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). Various peripherals may be connected to the I/O controller (s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers), or any other type of device that is operative to provide inputs to or receive outputs from the data processing system. Also, many devices referred to as input devices or output devices may both provide inputs and receive outputs of communications with the data processing system. For example, the processor 1002 may be integrated into a housing (such as a tablet) that includes a touch screen that serves as both an input and display device. Further, some input devices (such as a laptop) may include a plurality of different types of input devices (e.g., touch screen, touch pad, keyboard). Also, other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, that may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives, and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026, and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (not a part of data processing system 1000), which may be any public or private data processing system network or combination of networks, as known to those of skill in the art, including the Internet. The data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. When referring to a data processing system, such a system may be implemented across several data processing systems organized in a distributed system in communication with each other via a network.

Further, the term "controller" means any device, system, or part thereof that controls at least one operation, whether such a device is implemented in hardware, firmware, software, or some combination of at least two of the same. The functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The processor described herein may be located in a server that is remote from the display and input devices described herein. In such an example, the described display device and input device may be included in a client device that communicates with the server (and/or a virtual machine executing on the server) through a wired or wireless network (that may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, that may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "comprise" and "comprise," as well as derivatives thereof, mean inclusion without limitation. The singular forms "a," "an," and "the" are intended to comprise the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to comprise, be comprised within, interconnect with, contain, be contained within, connect to or with, couple to or with, be communicable with, cooperate with, interleave, juxtapose, be proximate to, be bound to or with, have, have a property of, or the like.

Also, although the terms "first," "second," "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. A processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, which must be comprised in the claim scope: the scope of patented subject matter is defined only by the allowed claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for engineering a physical system, the method comprising:
provided engineering information in an engineering database, the engineering information being related to at least one of physical, mechanical, electrical, electronic, hydraulic, thermal, control, electric power, or process-oriented information of the physical system;
providing lifecycle information in a lifecycle database, the lifecycle information being related to at least one of a conception, requirements, uses cases, issues, design, realization, or service information of the physical system, wherein the lifecycle information comprises a plurality of thousands of lifecycle information items, wherein the physical system is characterized by at least one characteristics, the respective characteristics comprising at least one of a structure, a hierarchy, a model, a property, or a component of the physical system, respectively; wherein the lifecycle information and the engineering information is further related to the respective characteristics;
displaying, by a display device, a portion of the engineering information and a portion of the lifecycle information of the physical system in an engineering user interface (UI);
displaying, by the display device, a UI element allowing the user to select at least one of the respective characteristics of the physical system in the engineering UI;
capturing a user's input relating to an import of less than ten percent of the plurality of thousands of lifecycle information items as selected lifecycle information from the lifecycle database to the engineering database in response to user interactions with the engineering UI, wherein the user's input includes at least a selection of at least one of the respective characteristics;

determining the selected lifecycle information as the lifecycle information corresponding to the selected respective characteristics;

generating a connector for importing the selected lifecycle information from the lifecycle database to the engineering database;

importing the selected lifecycle information from the lifecycle database to the engineering database using the generated connector; and determining further engineering information of the physical system using the lifecycle information selected by the user and imported from the lifecycle database to the engineering database and at least one of engineering, modeling, simulating, or analyzing the physical system using the engineering information.

2. The computer-implemented method of claim 1, wherein the generated connector comprises a Uniform Resource Locator (URL), a Uniform Resource Identifier (URI), or a Requirements Interchange Format (ReqIF) element.

3. The computer-implemented method of claim 1, wherein, if a plurality of the lifecycle information items has been selected for import from the lifecycle database to the engineering database, the generated connector comprises one Uniform Resource Locator (URL) for all the selected lifecycle information items and one Uniform Resource Identifier (URI) for each selected lifecycle information item.

4. The computer-implemented method of claim 1, wherein the lifecycle information is characterized by at least one lifecycle information property; and the method further comprising:
displaying a further UI element allowing the user to select at least one of the respective lifecycle information property in the engineering UI;
capturing the user's input relating to a selection of at least one of the respective lifecycle information property; and
determining the lifecycle information items as the lifecycle information corresponding to the selected, respective lifecycle information property.

5. The computer-implemented method of claim 1, further comprising:
displaying the engineering UI to the user in a web browser.

6. The computer-implemented method of claim 1, further comprising:
importing amended, selected lifecycle information from the lifecycle database to the engineering database; and
determining updated further engineering information of the physical system upon amendment of the selected lifecycle information in the lifecycle database.

7. The computer-implemented method of claim 1, the method further comprising:
providing additional engineering information in the engineering database, the additional engineering information being related to at least one of physical, mechanical, electrical, electronic, hydraulic, thermal, control, electric power, or process-oriented information of the physical system;
generating an additional connector for importing the additional engineering information from the engineering database to the lifecycle database;
importing the additional engineering information from the engineering database to the lifecycle database using the additional, generated connector;

determining further lifecycle information of the physical system using the additional engineering information imported from the engineering database to the lifecycle database; and
storing the determined further lifecycle information in the lifecycle database.

8. The computer-implemented method of claim 1, further comprising:
measuring or determining the engineering information of the physical system using a sensor, CAD data, or communication data relating to the physical system.

9. The computer-implemented method of claim 1, further comprising:
displaying the determined further engineering information to the user in the engineering UI; and
at least one of analyzing, monitoring, operating, controlling, or producing the physical system using to the engineering information and the further engineering information.

10. A non-transitory computer readable storage medium comprising a set of computer-readable instructions stored thereon for engineering a physical system, the instructions which, when executed by at least one processor cause the at least one processor to:

provide engineering information in an engineering database, the engineering information being related to at least one of physical, mechanical, electrical, electronic, hydraulic, thermal, control, electric power, or process-oriented information of the physical system;

provide lifecycle information in a lifecycle database, the lifecycle information being related to at least one of a conception, requirements, uses cases, issues, design, realization, or service information of the physical system, wherein the lifecycle information comprises a plurality of thousands of lifecycle information items, wherein the physical system is characterized by at least one characteristics, the respective characteristics comprising at least one of a structure, a hierarchy, a model, a property, or a component of the physical system, respectively; wherein the lifecycle information and the engineering information is further related to the respective characteristics;

display, by a display device, a portion of the engineering information and a portion of the lifecycle information of the physical system in an engineering user interface (UI);

display, by the display device, a UI element allowing the user to select at least one of the respective characteristics of the physical system in the engineering UI;

capture a user's input relating to an import of less than ten percent of the plurality of thousands of lifecycle information as the selected lifecycle information from the lifecycle database to the engineering database in response to user interactions with the engineering UI, wherein the user's input includes at least a selection of at least one of the respective characteristics;

determining the selected lifecycle information as the lifecycle information corresponding to the selected respective characteristics;

generate a connector for importing the selected lifecycle information from the lifecycle database to the engineering database;

import the selected lifecycle information from the lifecycle database to the engineering database using the generated connector; and determine further engineering information of the physical system using the lifecycle information selected by the user and imported from the lifecycle database to the engineering database and at least one of engineering, modeling, simulating, or analyzing the physical system using the engineering information.

11. The non-transitory computer readable storage medium of claim 10, wherein the generated connector comprises a Uniform Resource Locator (URL), a Uniform Resource Identifier (URI), or a Requirements Interchange Format (ReqIF) element.

12. The non-transitory computer readable storage medium of claim 10, wherein, if a plurality of the lifecycle information items has been selected for import from the lifecycle database to the engineering database, the generated connector comprises one Uniform Resource Locator (URL) for all the selected lifecycle information items and one Uniform Resource Identifier (URI) for each selected lifecycle information item.

13. The non-transitory computer readable storage medium of claim 10, wherein the lifecycle information is characterized by at least one lifecycle information property; and
wherein the instructions cause the at least one processor to:
display a further UI element allowing the user to select at least one of the respective lifecycle information property in the engineering UI;
capture the user's input relating to a selection of at least one of the respective lifecycle information property; and
determine the lifecycle information items as the lifecycle information corresponding to the selected, respective lifecycle information property.

14. The non-transitory computer readable storage medium of claim 10, further comprising instructions that cause the at least one processor to:
display the engineering UI to the user in a web browser.

15. A data processing system comprising at least one processor and a memory, the data processing system configured to:
provide engineering information in an engineering database, the engineering information being related to at least one of physical, mechanical, electrical, electronic, hydraulic, thermal, control, electric power, or process-oriented information of the physical system;
provide lifecycle information in a lifecycle database, the lifecycle information being related to at least one of a conception, requirements, uses cases, issues, design, realization, or service information of the physical system, wherein the lifecycle information comprises a plurality of thousands of lifecycle information items, wherein the physical system is characterized by at least one characteristics, the respective characteristics comprising at least one of a structure, a hierarchy, a model, a property, or a component of the physical system, respectively; wherein the lifecycle information and the engineering information is further related to the respective characteristics;
display, by a display device, a portion of the engineering information and a portion of the lifecycle information of the physical system in an engineering user interface (UI);
display, by the display device, a UI element allowing the user to select at least one of the respective characteristics of the physical system in the engineering UI;
capture a user's input relating to an import of less than ten percent of the plurality of thousands of lifecycle information as the selected lifecycle information from the lifecycle database to the engineering database in response to user interactions with the engineering UI, wherein the user's input includes at least a selection of at least one of the respective characteristics;
determining the selected lifecycle information as the lifecycle information corresponding to the selected respective characteristics;
generate a connector for importing the selected lifecycle information from the lifecycle database to the engineering database;
import the selected lifecycle information from the lifecycle database to the engineering database using the generated connector; and
determine further engineering information of the physical system using the lifecycle information selected by the user and imported from the lifecycle database to the engineering database and at least one of engineering, modeling, simulating, or analyzing the physical system using the engineering information.

* * * * *